United States Patent [19]

Rogers et al.

[11] Patent Number: 5,621,455
[45] Date of Patent: Apr. 15, 1997

[54] VIDEO MODEM FOR TRANSMITTING VIDEO DATA OVER ORDINARY TELEPHONE WIRES

[75] Inventors: Steven Rogers, Leesburg; John Gerig, Reston, both of Va.

[73] Assignee: Objective Communications, Inc., Reston, Va.

[21] Appl. No.: 352,112

[22] Filed: Dec. 1, 1994

[51] Int. Cl.$^6$ .................................................. H04N 7/10
[52] U.S. Cl. ........................ 348/6; 348/12; 348/388
[58] Field of Search .................................... 348/6, 12, 14, 348/15, 16, 17, 388, 389; 379/96, 97, 98; 370/71, 72, 73, 76, 124, 85.1, 85.2, 85.3; H04N 7/10, 7/14, 7/12

[56] References Cited

U.S. PATENT DOCUMENTS

| | | |
|---|---|---|
| 3,974,337 | 8/1976 | Tatsuzawa . |
| 4,054,910 | 10/1977 | Chou et al. . |
| 4,589,011 | 5/1986 | Rzeszewski .............................. 348/389 |
| 4,955,048 | 9/1990 | Iwamura et al. . |
| 5,010,399 | 4/1991 | Goodman et al. . |
| 5,164,980 | 11/1992 | Bush et al. . |
| 5,283,637 | 2/1994 | Goolcharan . |

*Primary Examiner*—John K. Peng
*Assistant Examiner*—Sherrie Hsia
*Attorney, Agent, or Firm*—Banner & Witcoff, Ltd.

[57] ABSTRACT

An apparatus and method is provided for modulating and transmitting full-motion, television-quality color video signals along with digital data signals over a pair of ordinary unshielded twisted pair telephone wires without interfering with normal telephone data on the wires. The invention is characterized by a transmission method involving frequency modulation of a baseband video signal and subsequent filtering to suppress an upper sideband corresponding to a color component of the original video signal. The filtered signal is received from the telephone wires at a different location, filtered, demodulated and provided to a display device. Full-duplex operation over the same pair of wires is possible, such that two video signals may be simultaneously transmitted, each signal having an approximate bandwidth of 6 MHz and shifted to a desirable non-interfering frequency location within the approximately 20 MHz of usable bandwidth on the telephone wires. No pre-emphasis or de-emphasis is required to achieve good quality video transmission. The system has many applications including video distribution, conferencing, and communications.

55 Claims, 8 Drawing Sheets

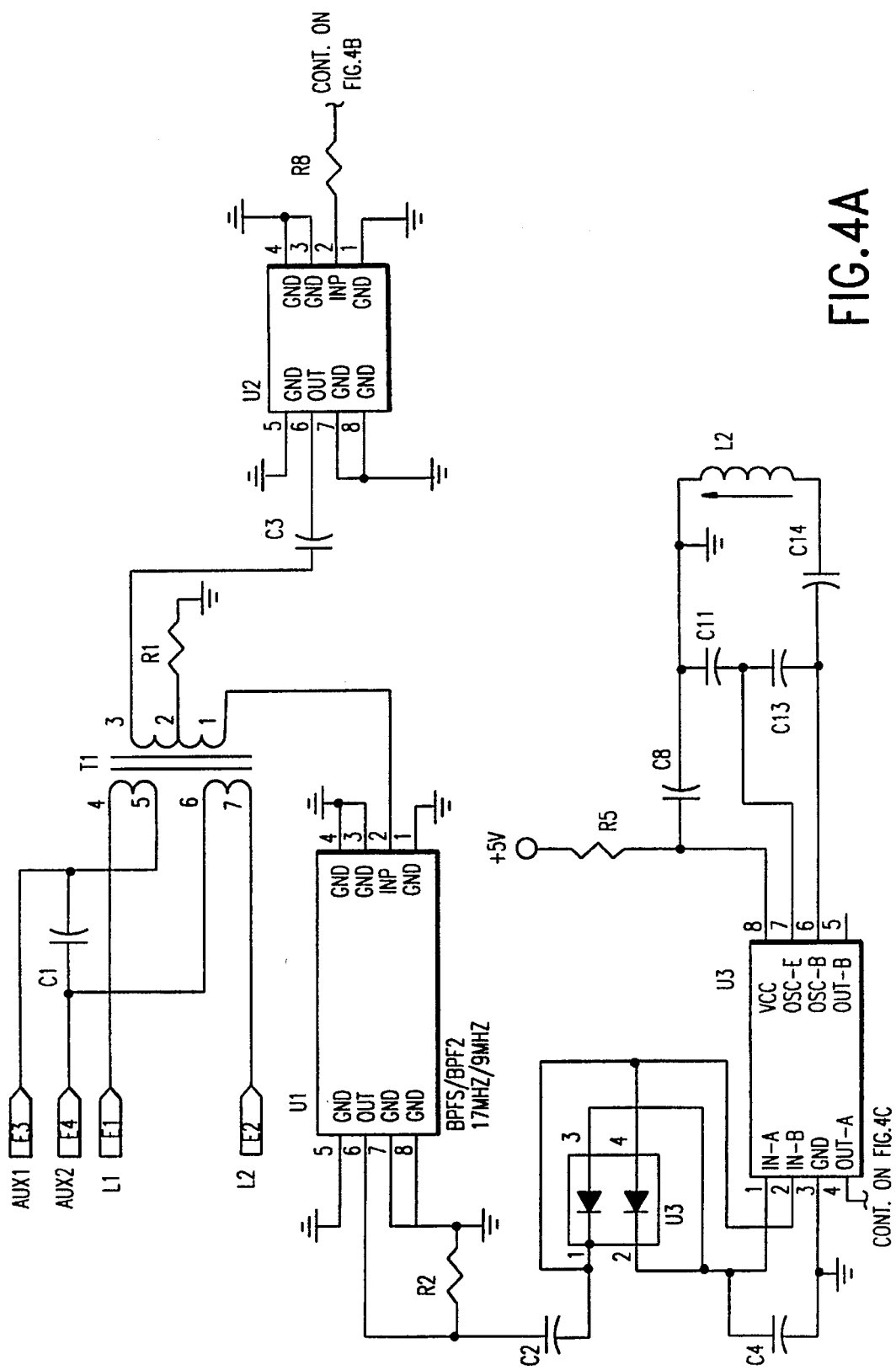

VIDEO MODEM FOR TRANSMITTING VIDEO DATA OVER ORDINARY TELEPHONE WIRES

BACKGROUND OF THE INVENTION

1. Technical Field

This invention relates generally to transmission of full-motion, television-quality color video signals and associated data and audio signals over ordinary unshielded twisted pair (UTP) telephone wiring and, more particularly, to an apparatus and method for bidirectionally transmitting such signals over a telephone wire without interfering with normal telephone signals on the wire.

2. Related Information

Unshielded twisted pair (UTP) wiring is used in many office buildings to transmit voice grade signals and low-speed data such as that generated by modems. Such wiring normally runs between 20 and 2,000 feet from a central switch or entry point to a particular telephone. A private branch exchange (PBX) is often used to connect the building wiring network to an external set of telephone lines provided by a telephone company.

Beyond an office building, however, telephone companies typically restrict the bandwidth of a particular outside "line" to no more than about 4 KHz, severely hampering the ability to transmit anything other than very low bandwidth data over long distances. As is self-evident, a typical NTSC television signal requiring approximately 6 MHz of bandwidth cannot be directly transmitted over such lines. Some companies have attempted to compress and otherwise manipulate various types of video signals to fit within the limited bandwidth of telephone wires. A representative example of such a system is disclosed in U.S. Pat. No. 5,164,980 to Bush et al. (video telephone system).

Within an office building, however, the telephone wiring is not artificially limited in bandwidth, but instead suffers from the inherent transmission qualities of the wiring such as phase shifts and attenuation at higher frequencies. Thus, significantly higher data transmission bandwidths may be achieved within an office building or other structure having similar wiring arrangements. However, the wiring transmission effects can cause drastic changes in received waveforms. These effects, while quite tolerable in voice communications, destroy the integrity of individual pulses of a baseband video signal. For example, attempting to directly transmit a baseband NTSC video signal over UTP wiring in a building would result in a wholly unacceptable result (and would also interfere with normal telephone data). Amplitude modulating such a signal (as is done in TV transmitters) also would result in an unacceptable result. As shown in the following Table 1, the typical attenuation loss as a function of frequency along 2,000 feet of UTP wire is severe:

TABLE 1

| FREQ (MHz) | LOSS (dB) |
| --- | --- |
| 5 | 38 |
| 10 | 58 |
| 15 | 72 |
| 17 | 76 |
| 20 | 82 |

Various schemes have been developed in an attempt to overcome the above problems and others. For example, some schemes involve separating various components of an NTSC signal (such as a luminance signal and a chrominance signal) and separately modulating and transmitting them. One example of such a scheme is illustrated in U.S. Pat. No. 4,955,048 to Iwamura et al. However, such schemes often require complex and expensive signal processing circuits and may be particularly sensitive to device tolerances.

Video teleconferencing systems are known in which two-way visual and audio communication is possible between individuals or groups at different locations. Video conferencing systems, however, require expensive equipment, high bandwidth communication channels, and fiber optic or other high bandwidth wiring throughout a building. High quality video conferencing over existing telephone wiring has heretofore been difficult, expensive, or impossible in many cases. For these reasons, a need exists for providing an inexpensive teleconferencing method and apparatus for use within buildings which have ordinary telephone wiring, without requiring special wiring or expensive transmission equipment.

SUMMARY OF THE INVENTION

The present invention solves the aforementioned problems by providing a method and apparatus for inexpensively transmitting full-motion, television-quality color video signals and other signals over ordinary unshielded twisted pair (UTP) telephone wires. The invention is characterized by a transmission method which allows two NTSC composite signals, along with data and audio signals, to be simultaneously transmitted bidirectionally over a single pair of wires without interfering with normal voice data and other signals transmitted on the same pair of wires.

In various preferred embodiments, an NTSC signal is transmitted using an FM signal having a low modulation index and a suppressed upper sideband. In a typical telephone installation, the cable run length between the central switch or entry point to the telephone itself can vary, but is usually between 20 and 2,000 feet. By using frequency modulation, the demodulator can amplify and then limit the received signal. No adjustments are required to set up the demodulator for each cable run.

Other features and advantages of the invention will become apparent through the following detailed description and drawings.

BRIEF DESCRIPTION OF THE DRAWINGS

FIG. 1(a) shows the spectrum distribution for an NTSC color signal at baseband; FIG. 1(b) shows a full amplitude modulated NTSC signal; and FIG. 1(c) shows a vestigial sideband AM modulated signal, the lower picture sideband having been substantially removed.

FIGS. 4A–4D are more detailed circuit schematics illustrating specific components which may be used in a transmit/receive circuit.

DETAILED DESCRIPTION OF THE PREFERRED EMBODIMENTS

Figure 1A:
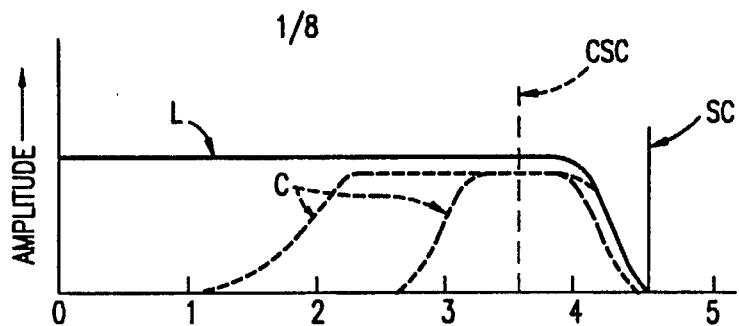
FIGS. 1(a)–1(c) show a frequency spectrum for a composite NTSC television signal.
Figure 1B:
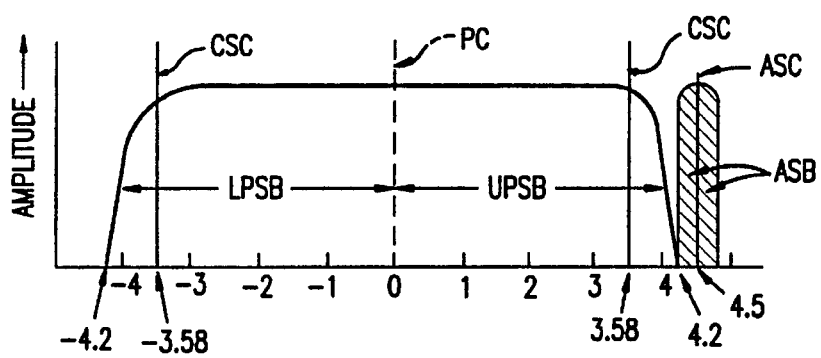
Figure 1C:
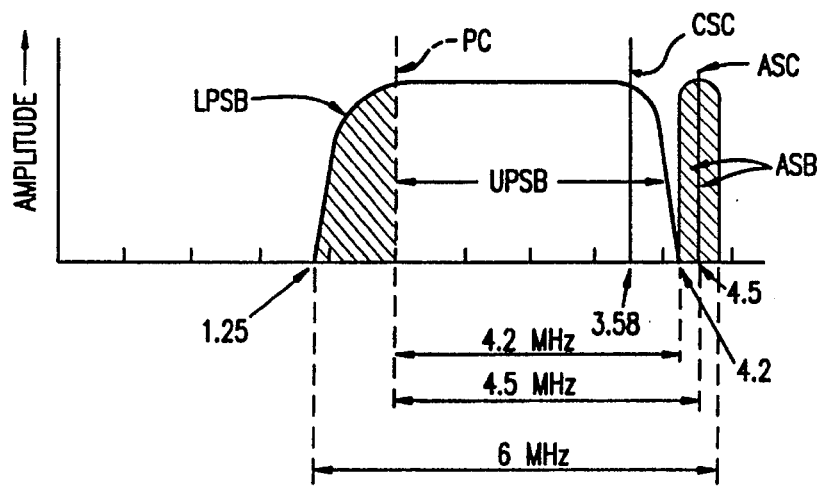

FIGS. 1(a)–1(c) show the spectrum of a typical NTSC television signal. As shown in FIG. 1(a), a baseband composite NTSC video signal occupies approximately 4.2 MHz of bandwidth, including luminance signal L, color subcarrier CSC, and color signals C comprising chrominance information (hue and saturation). A sound carrier SC also may be provided with the video signal to transmit audio information. Although not explicitly shown in FIG. 1(a), the well-known NTSC signal comprises various other synchronizing signals needed to reconstruct the original signal at the receiver. Details of the signal structure are set forth in standards promulgated by the FCC (FCC Rules, 47 C.F.R. § 73.699, incorporated herein by reference).

When the baseband NTSC signal is used to amplitude modulate a carrier signal, the bandwidth is typically doubled, to at least 8.4 MHz. As shown in FIG. 1(b), the process of amplitude modulation using the baseband video signal produces a signal having an upper picture sideband UPSB and a lower picture sideband LPSB centered around the picture carrier PC. Both sidebands in any signal contain all the necessary intelligence to recreate the original information. An audio subcarrier ASC includes two audio sidebands ASB.

As shown in FIG. 1(c), commercial television transmitting stations use vestigial sideband AM transmission. The transmitting equipment suppresses the lower picture sideband in order to reduce the required bandwidth (hence the term, "vestigial sideband modulation"). The lower sideband is mostly removed, leaving only a "vestige" in addition to the upper sideband. This allows commercial TV to be transmitted with a 6 MHz channel spacing, including audio carriers and guard bands, so that many TV stations can simultaneously broadcast without interfering with each other.

Bandwidth is much more limited on UTP telephone wires. To achieve a 2,000 foot transmission distance, it is necessary to limit the total transmission bandwidth to less than 20 MHz. As pointed out previously, attempting to transmit an amplitude modulated video signal (such as is done with commercial television transmitters) is not feasible over ordinary telephone wire due to severe transmission effects including distortions which cause unacceptable group delays. Although the use of frequency or phase modulation instead of amplitude modulation could mitigate some of these effects, the bandwidth required would be prohibitive.

Even with narrow deviation FM, a frequency modulated carrier produces a signal spectrum that is a least twice the baseband frequency. For video signals, that would require a minimum of 10 MHz per channel. For full-duplex operation (i.e., simultaneously transmitting video signals in both directions over the same wire), two 10 MHz channels would be needed, which would consume all of the practically available bandwidth with no guardbands.

To overcome the aforementioned limitations, the present invention contemplates the use of a "vestigial sideband FM" signal. This means that one of the FM modulation sidebands is removed at the transmitter, preferably the upper sideband for reasons that will become apparent. By using this type of modulation, the original NTSC baseband signal can be reconstructed using only 6 MHz of bandwidth while allowing for a few megahertz of interchannel guard band. The 6 MHz band can include a broadcast quality video signal and the accompanying audio signal, although in various embodiments the audio signal is filtered out along with the upper sideband. One or more CD-quality audio signals may also be transmitted using a separate data channel.

It should be recognized that the principles of the present invention may also be used with PAL and SECAM-type television signals, with appropriate modifications in the bandwidths and center frequencies to accommodate the differences in spectra. For example, instead of 6 MHz channel bandwidth, PAL and SECAM systems can employ 7–8 MHz channel bandwidths. Details of the PAL and SECAM signal structure are well known, and are not repeated here.

Although AM and narrowband FM have similar frequency spectra, they are distinctively different methods of modulation. In the AM case, the carrier envelope is varied, the frequency remaining unchanged; in the FM case, the carrier amplitude is assumed to be constant, the phase (and instantaneous frequency) varying with the signal. It should be noted that using a low FM modulation index would appear to defeat many of the advantages gained by using FM modulation in the first place but, as described herein, the resulting signal is suitable for transmitting television-quality pictures over ordinary telephone wire, even without using traditional emphasis/deemphasis circuitry. The use of a smaller modulation index helps prevent phase shifts which would occur at higher deviations.

Figure 2:
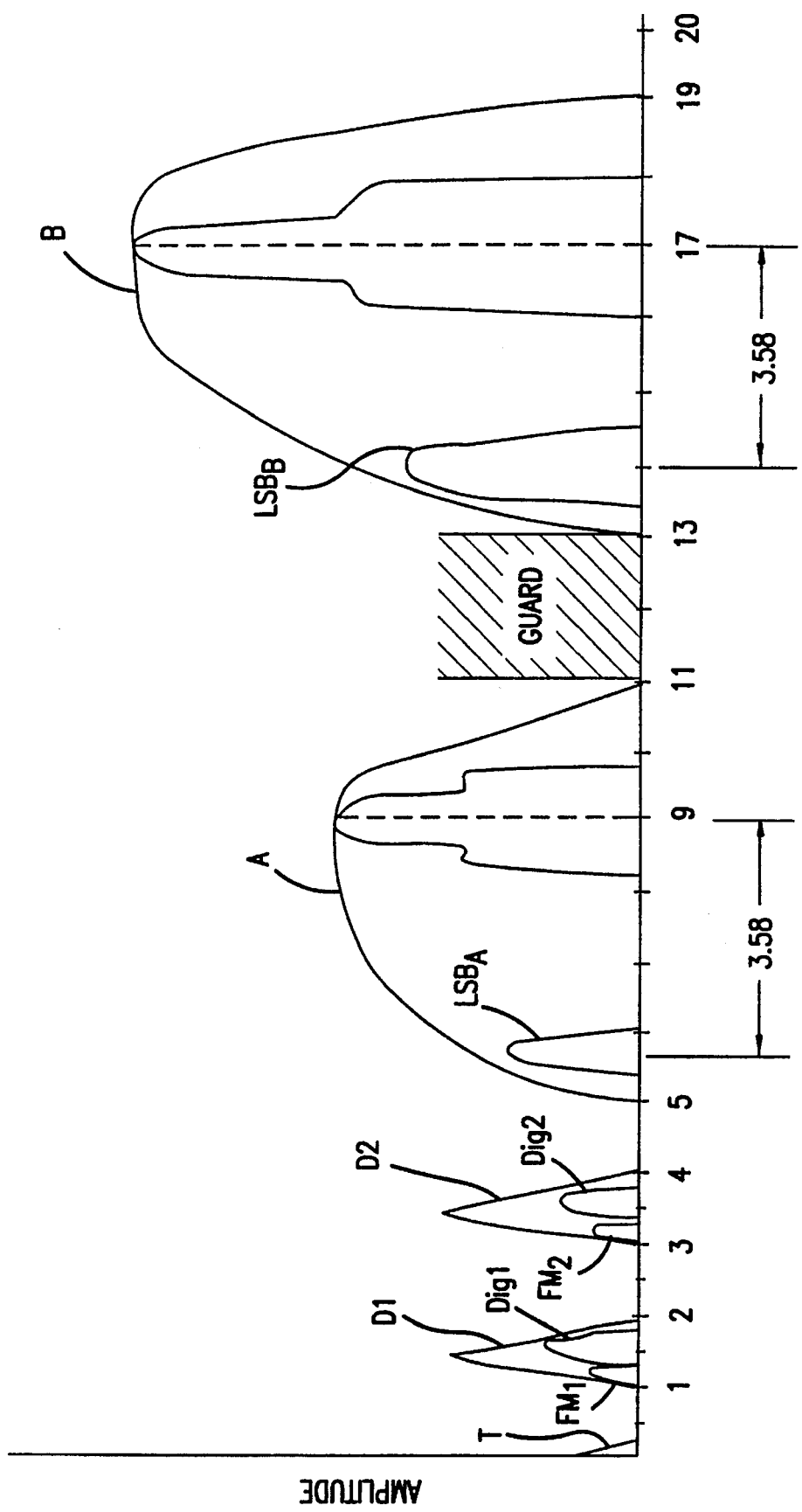
FIG. 2 shows a frequency plan for use in allocating signals to frequency bands in a single telephone-grade wire in accordance with the present invention.

As shown in FIG. 2, the present invention contemplates a frequency plan which allows for several signals to be simultaneously transmitted within the bandwidth available on UTP wire. In FIG. 2, amplitude is represented on the vertical axis and frequency in megahertz is represented on the horizontal axis. A number of signals are allocated in the frequency band ending at about 20 MHz, the preferred limit for unshielded telephone wire as contemplated in the present invention. As described in more detail below, video signals A and B may be used for transmitting video-quality images across the UTP wire.

A first signal T represents existing telephone signals at the very low end of the spectrum. These signals may be analog or digital. In either case, their spectrum components are normally much less than 1 MHz.

Data signals D1 and D2 may be centered about 1.5 MHz and 3.5 MHz, respectively, and may be used to transmit high-speed data bidirectionally across the wire using any of various well known modulation methods (including PSK, QAM, or FSK modulations). Alternatively, data signals D1 and D2 may each comprise an FM signal (FM1 and FM2, respectively), for transmitting frequency modulated audio data corresponding to video signals A and B, respectively. Moreover, digital data signals Dig1 and Dig2 represent digitally modulated data streams which may also accompany video signals A and B. Thus, each data signal D1 and D2 may comprise any of various types of signal modulation which may be used to transmit information which is preferably related to corresponding video signals A and B respectively. The exact frequency placement of data signals D1 and D2 may be varied, consistent with telephone signal T and video signals A and B.

A carrier for video transmitter signal A is illustrated as being centered about 9 MHz and a carrier for video transmitter signal B is illustrated as being centered about 17 MHz. An "outer" lower sideband of signal A (corresponding to the color subcarrier) is represented by $LSB_A$, while an "outer" lower sideband of signal B (corresponding to the color subcarrier) is represented by $LSB_B$. The upper sidebands containing the color subcarrier signals have been suppressed in FIG. 2 and are thus not shown. The sound carriers, located above the upper color sidebands, have also been suppressed and are not shown.

In accordance with the frequency plan of FIG. 2, two video signals may be simultaneously transmitted across a single wire, each having an approximate bandwidth of 6 MHz. It should be noted that the illustrated center frequencies of the video and data signals are by way of example only, and it is of course possible to move these signals around within the approximately 20 MHz of usable bandwidth or even beyond (if one is willing to accept lower quality picture signals). Moreover, it may be possible to use bandwidths of less than 6 MHz for each video signal, with readily recognizable tradeoffs in picture quality and the like.

Good picture quality over ordinary telephone wire can be obtained by using an NTSC video signal to frequency modulate a carrier signal and transmitting only the carrier, close-in sidebands, and one outlying sideband containing the color subcarrier at 3.58 MHz, preferably the lower sideband. In one experiment, the carrier signal was centered at 10 MHz approximately, close-in sidebands fell in the range of 9 to 11 MHz, and the outlying lower sideband fell at 6.42 MHz (i.e., 10 MHz–3.58 MHz). A SAW filter having a 3 dB bandwidth of 6 MHz was used. This passband was frequency translated to fall between about 5 and 11 MHz. The lower sideband centered on 6.42 MHz actually has its own "subsidebands" which imitate in shape the close-in sidebands around 10 MHz. It appears to be important to transmit these sub-sidebands with reasonable fidelity in order to maintain good picture quality. Extending the filter passband down to 5 MHz (i.e., about 1.6 MHz below 6.42 MHz) seems to satisfy this requirement.

Considering the simple phase modulation of a carrier with a low modulation index, the effect of suppressing one sideband is to convert the purely phase-modulated carrier into one which is simultaneously amplitude and phase modulated. If this signal is then passed through a limiter at the receiving end to suppress the amplitude modulation, a pure phase modulation is restored, but with a halving of the modulation index.

By placing the carrier near the upper end of the pass band, so that the transmitted sideband is the lower one, the effect of increasing attenuation with frequency in the twisted-pair cable is to boost the lower sideband relative to the carrier. This is in the optimum direction to compensate for the reduction in modulation index due to suppression of the upper sideband. Because the sound carrier in each NTSC signal is located in the portion of spectrum which is "cut off" by transmitting only the lower sideband, the audio signal may instead be modulated onto an FM carrier and transmitted as FM1 or FM2, for example (see FIG. 2).

In duplex operation over UTP, filtering is required to separate the transmitted signal from the much weaker received signal, and some allowance must be made for the guard or transition bands of the filters used. Even in the case of a SAW filter, the transition band may be about 1 MHz wide. In various embodiments, a guard band width of 2 MHz has been assumed.

Based on the above considerations, a frequency plan such as that illustrated in FIG. 2 is preferred, but it is not intended to limit in any way the principles of the invention. As one example, a proximal transceiver may be located at the central telephone switch point, and a distal transceiver at a user's terminal such as in an office. The proximal transmitter carrier frequency may be 17 MHz, with nominal band limits of 13 to 19 MHz (signal B in FIG. 2). The distal transmitter carrier may be 9 MHz, with band limits of 5 to 11 MHz (signal A in FIG. 2). Thus, the guard band is from 11 to 13 MHz. It is a simple matter to make minor adjustments in these carrier frequencies to optimize performance in any particular application.

As the losses illustrated in Table 1 show, the predicted loss of 2000 ft of UTP level 3 will be about 76 dB at 17 MHz, but only about 56 dB at 9 MHz, or 20 dB less. Since there is a need for some minimum carrier-to-noise ratio at the receiver, it is desirable to transmit with more power at 17 MHz than at 9 MHz.

Still another consideration is that second harmonic distortion of the 9 MHz carrier, at 18 MHz, will have to be strongly suppressed at the distal station in order to avoid interference with the weak received carrier at 17 MHz. Thus it is fortuitous that the 9 MHz carrier can be relatively weaker. In the case of the 17 MHz transmitter, harmonic components at 34 MHz and above will be well removed from the receiver passband.

Assuming a noise figure of 10 dB in the receiver, together with a noise bandwidth of 6 MHz, a received signal strength at the distal station of −59 dBm should yield a video signal-to-noise ratio of about 37 dB, which should be adequate for most purposes.

Figure 3:
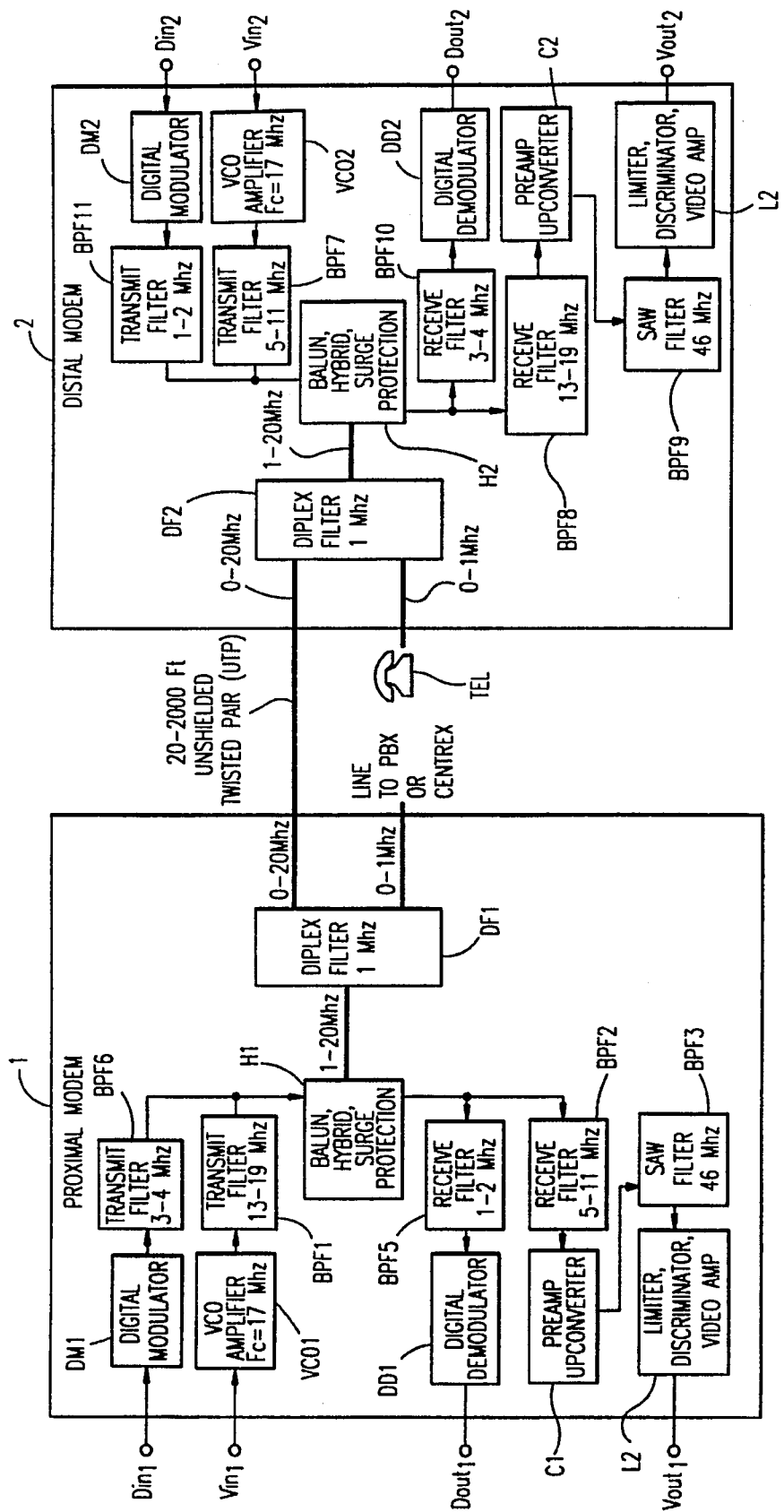
FIG. 3 is a simplified block diagram showing components used to simultaneously transmit and receive two NTSC signals in accordance with the principles of the present invention.
Figure 4B:
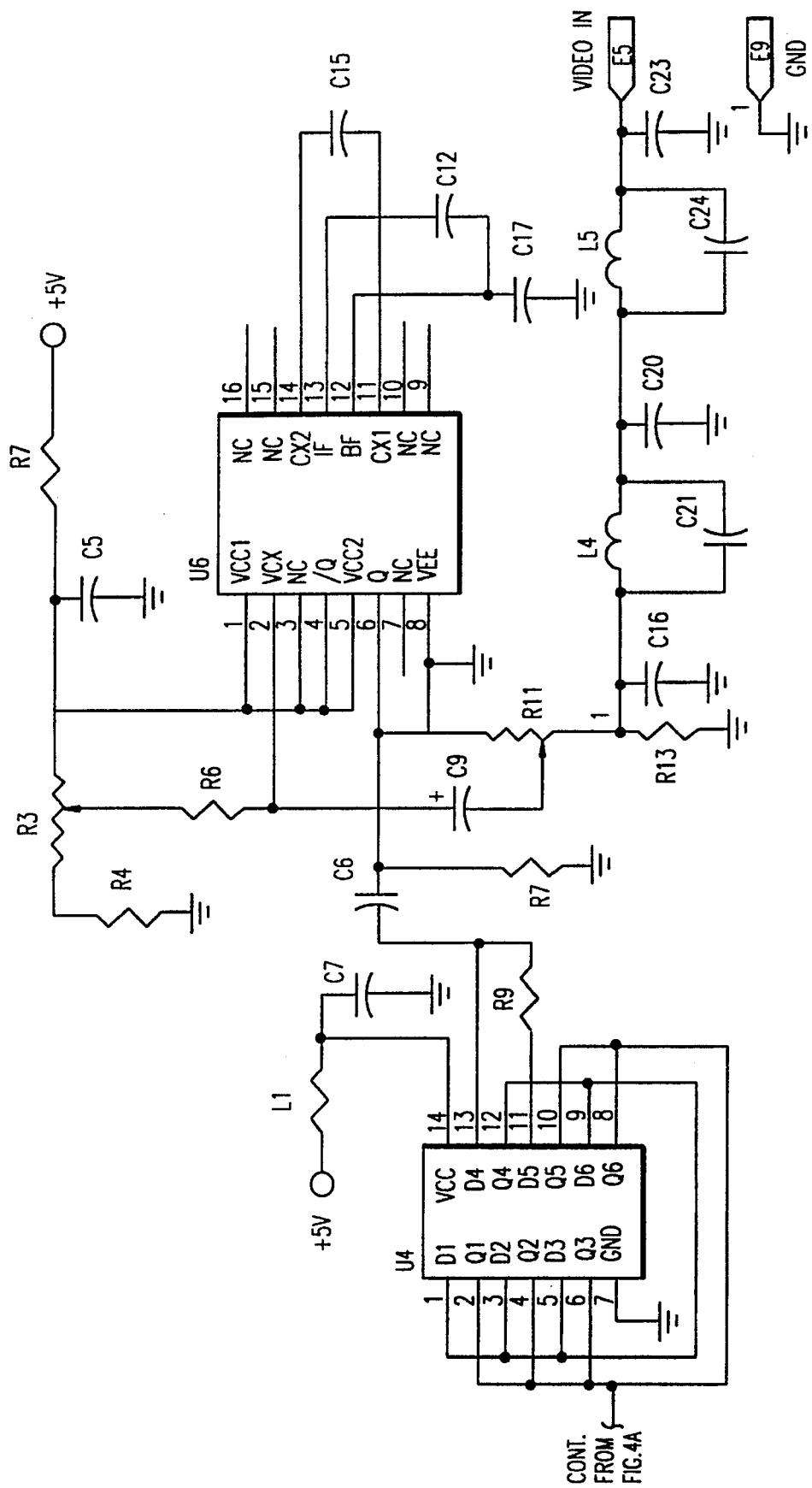
Figure 4C:
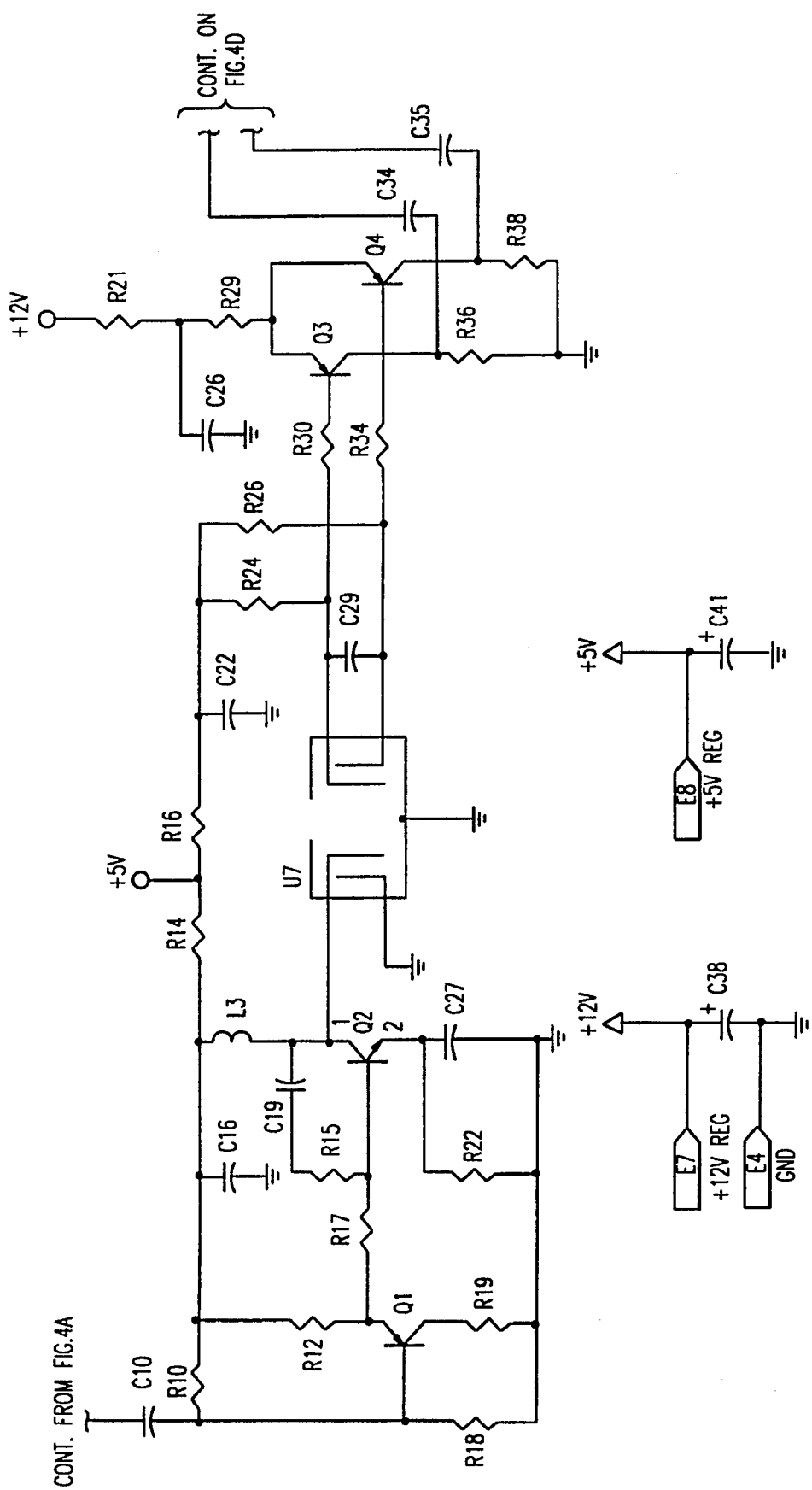
Figure 4D:
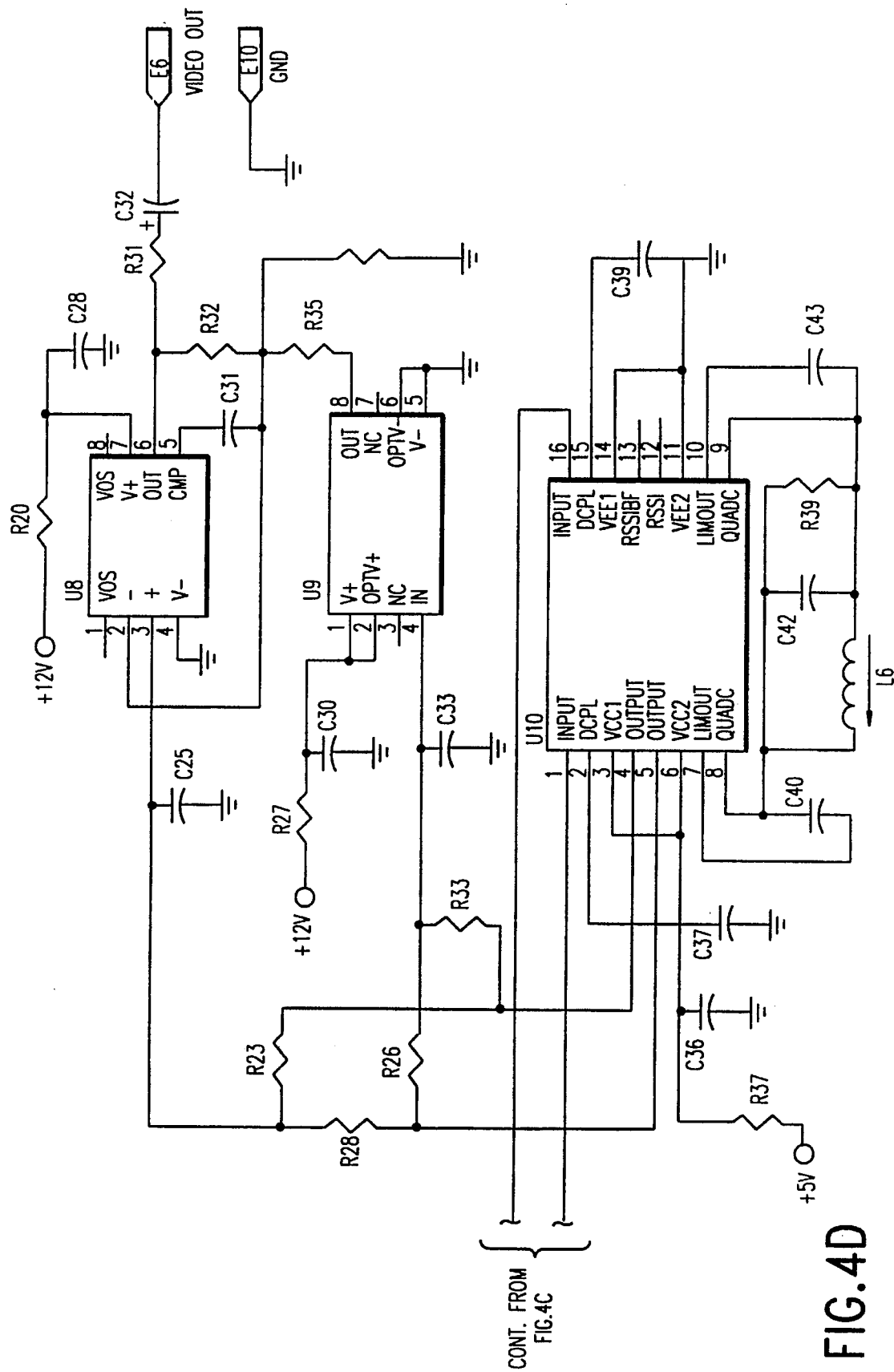

FIG. 3 illustrates in block diagram form components used for carrying out the principles of the present invention between a first transceiver 1 and a second transceiver 2. As illustrated in FIG. 3, transceiver 1 accepts a first video signal $V_{IN1}$ and, after processing it in accordance with the principles of the invention, transmits it over wire UTP to transceiver 2, which regenerates the original signal and outputs video signal $V_{OUT2}$ for display on a television receiver. Similarly, transceiver 2 accepts a second video signal $V_{IN2}$ as input and, after processing it in accordance with the principles of the invention, transmits it over the same UTP to transceiver 1, which regenerates the original signal and outputs video signal $V_{OUT1}$. The input video signals may be generated from a camera, a VCR, computer, or the like, and the output signals may be provided to a display or recording device such as a video monitor, another VCR, or a computer video display.

Wire UTP may also be connected to one or more telephones TEL and to a switching unit (such as a PBX or Centrex), such that normal telephone conversations may be made over the same wire while the video signals are being transmitted. It should also be apparent that while bidirectional transmission with two transceivers is illustrated, it is of course possible for two video signals to be transmitted from a first location to a second location, each signal using a separate carrier frequency. In that case, two transmitting circuits would be required at one end and two receiving circuits at the other.

Beginning with transceiver 1, a first video signal $V_{IN1}$ is input to VCO/amplifier/mixer VCO1 having a carrier frequency of, for example, 17 MHz. The input video signal includes luminance and chrominance components as is known in the art and as illustrated in FIG. 1(a), and frequency modulation of this signal will produce upper and lower sidebands, each sideband having a "copy" of the color subcarrier. Although FIG. 1(b) shows the spectrum of an AM-modulated signal, the spectrum of an FM-modulated signal will be similar even though the signal is different. As noted previously, the signal modulated onto the 17 MHz carrier is preferably amplified relative to the signal modulated onto the 9 MHz carrier in order to compensate for attenuation losses at the higher frequencies.

The frequency modulated signal is passed through band pass filter BPF1 with a 6 MHz pass band spanning 13 to 19

MHz, although since in the frequency plan of FIG. 2 no signals are transmitted above 19 MHz, this filter functions to match impedances and to provide suppression of harmonics of 17 MHz. The filtered signal is input to balun transformer and hybrid circuit H1, which injects the signal into line UTP through diplex filter DF1. The purpose of the diplexing filter is to inject video modem signals onto the UTP while preventing video modem signals from entering the line.

Since the upper sideband has been removed, the signal injected from H1 has a frequency spectrum roughly shown by B illustrated in FIG. 2. Other data signals such as D1 may be input as illustrated in the frequency plan of FIG. 2 with appropriate modulation. Thus, for example, terminal $D_{IN1}$ may be used to accept a data signal (such as an audio signal) which is modulated by digital modulator DM1 and subsequently passed through filter BPF6 and injected into hybrid H1. Recovery of the signal in transceiver 2 is through filter BPF10 and digital demodulator DD2 to output terminal $D_{OUT2}$. Although not explicitly shown in FIG. 3, an FM modulator may also be included to transmit frequency modulated audio signals such as FM1 and FM2 illustrated in FIG. 2, corresponding to video signals A and B respectively.

Because the components in transceiver 2 on the right side of FIG. 2 are similar to those on the left side (but using different frequency bands), the receiving function will be described with reference to transceiver 1, and the corresponding explanation for transceiver 2 is omitted for the sake of brevity.

Assuming that transceiver 2 transmits a second video signal to transceiver 1 over wire UTP (illustrated by signal A of FIG. 2), the signal is received in H1 and applied to band pass filter BPF2 having a preferred band pass range of 5 to 11 MHz. The filtered signal is applied to preamp and upconverter C1. In FIG. 3, each receiver is of the superheterodyne type, using a local oscillator and mixer to upconvert the signal to the 46 MHz center frequency of a SAW filter. This approach allows available SAW filters to be used, and has the further advantage of allowing the frequency plan to be modified. It should be noted that custom filter designs may be used instead, which eliminates the need for frequency conversion.

SAW filter BPF3 provides an amplified output to limiter/discriminator/video amp L2, which further amplifies the output to video levels (NTSC, PAL or SECAM) and the recovered video signal is output as $V_{OUT1}$. It has been determined that excellent results are obtained with no pre-emphasis or de-emphasis of the signal.

FIGS. 4A–4D show detailed schematic employing the principles of the present invention. The circuit operates from regulated +5 and +12 VDC supplies. The transmitter VCO U6 is a multivibrator with a relatively linear control characteristic. In the present invention, FM deviation is typically large compared to the carrier frequency so that moderate drift of center frequency and phase noise are of little concern.

The NTSC video input including the color subcarrier is applied at E5, and is passed through a low pass filter having a cutoff of about 5 MHz.

The multivibrator output is AC-coupled to one section of U4, a hex buffer which amplifies the multivibrator levels to 0 to 5 VDC. The amplified output drives the remaining 5 sections of U4 in parallel.

Since the hex buffer output is a square wave with numerous harmonics, it is important to design the following filter so that it has a high input impedance at the frequencies of these harmonics; i.e., the first circuit element must be a series inductor.

In the 17 MHz case, the output filter functions chiefly to match 7.5 ohms to a 50 ohm output impedance, and to provide moderate suppression of harmonics of 17 MHz. In the 9 MHz case, the filter must also provide attenuation of the second harmonic at 18 MHz.

In the case of the receive filters, the filters are typically designed for a 50 ohm input impedance, and a higher output impedance such as 400 or 800 ohms. The increase in impedance provides a voltage gain working into the relatively high input impedance of the U5 frequency converter.

Filters initially designed to pass the 9 MHz carrier were implemented using ferritecore inductors from a coil kit. High and mysteriously variable levels of second harmonic energy at 18 MHz were observed. These were found to be caused by non-linear distortion in the ferrite cores, which depended also on the orientation of the cores relative to the earth's magnetic field; i.e., a fluxgate magnetometer had been inadvertently implemented. Therefore, the use of air-core solenoids is recommended.

The output of the transmit bandpass filter is applied to a transformer T1 which simultaneously acts as a balun and as a 3 dB hybrid. In this transformer, terminals 4 and 7 are the balanced output driving the UTP with a nominal generator impedance of 100 ohms.

Terminals 5 and 6 of transformer T1 are shunted by capacitor C1, which is a relative short circuit above about 1 MHz. Signals or DC voltages below 1 MHz may be made available at terminals AUX1 and AUX2 for use with other equipment. Terminals 1 and 3 are mutually isolated 50 ohm ports of the hybrid. A 25 ohm load at terminal 2 in effect terminates the "sum" port of the hybrid transformer. The data signals can be coupled in using a diplexing filter designed to have a broadband input and two outputs, one corresponding to signals from DC to about 4 MHz, and the second, to signals from 5 MHz to above 20 MHz.

In the receive path, the received signal out of terminal 1 of transformer T1 is applied to receive filter BPF5 (BPF2) in the distal (proximal) transceiver. As noted previously, BPF2 should be designed to provide rejection in the band 13 to 20 MHz, encompassing the 18 MHz harmonic.

The filtered signal is applied to U5, a frequency converter device which combines the functions of a local oscillator and an active mixer. Back-to-back diodes U3 shunt the input to U5 in order to handle the strong received signals which would occur when the UTP line is short.

The U5 output has a generator impedance of about 1.5K. PNP emitter follower Q1 helps to bring this impedance down towards the 50 ohm input impedance of the Q2 stage. The Q1 emitter follower also helps to stabilize the DC operating point of the Q1-Q2 cascade against variation in $V_{BE}$ with temperature. The Q2 stage provides about 30 dB of voltage gain together with a high output capability (relative to the +5 VDC supply voltage) due to the use of L3 as a collector load. The Q2 stage has a low output impedance as is desired to improve SAW filter response.

The U7 SAW filter operates into a balanced load for improved input-output isolation. The small shunt capacitor, C29, slightly improves the shape of the SAW filter pass band.

The amplified output of the SAW filter is applied to U10, a limiter-discriminator circuit. Apart from an adjustment of the quadrature coil network for wideband operation at 46 MHz, this circuit yields good limiting action over a 40 dB range, with excellent discriminator linearity.

Wideband buffer U9 and op amp U8 implement a differential input video amplifier to amplify the output of the discriminator to NTSC video levels. The ripple frequency at the output of U10 is about 92 MHz. Thus simple low-pass filtering by C25 and C33 provides adequate rejection of ripple in the video output.

With respect to pre-emphasis of the signal applied to the FM modulator, it is perceived as a distinct advantage of the present invention that no preemphasis and de-emphasis is needed, although the invention will of course operate with such additional circuitry.

Figure 5:
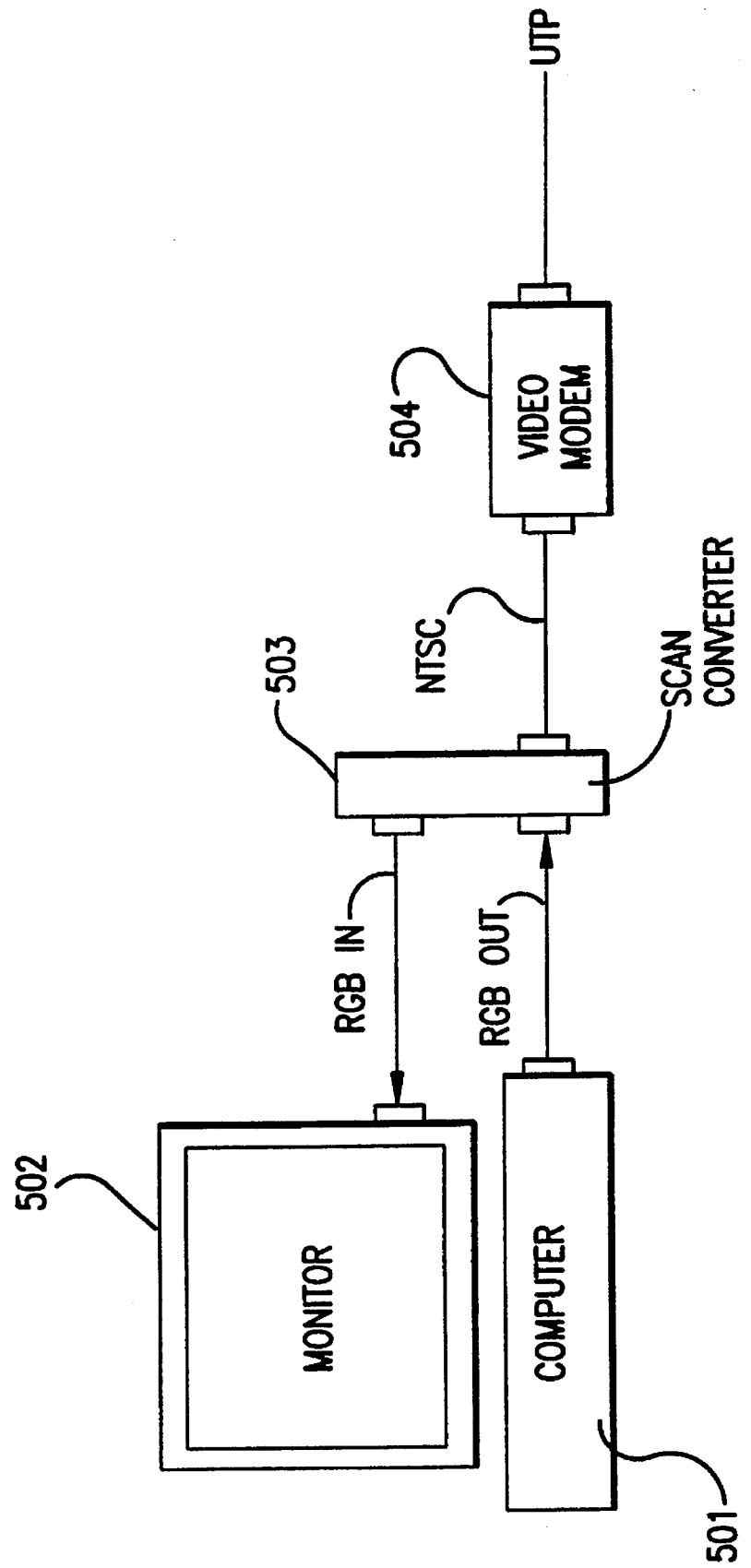
FIG. 5 shows how data displayed on computer monitor may be transmitted over telephone lines in accordance with the invention.

FIG. 5 shows how the principles of the present invention can be employed to transmit data displayed on a computer monitor. Computer 501 may be a PC-type computer having a red-green-blue (RGB) output which is supplied to a scan converter 503 which is well known in the art. The RGB signal from computer 501 is input to computer monitor 502 to drive its display. Scan converter 503 converts the RGB signals to a video format such as NTSC format, and supplies it to video modem 504 which is constructed in accordance with the principles of the present invention and coupled to telephone line UTP. Thus, data which is displayed on computer monitor 502 may be transmitted over telephone line UTP and simultaneously displayed on another monitor at the receiving end.

Thus has been described a method and apparatus for transmitting television-quality video signals as well as other signals over ordinary telephone-grade wire in accordance with a suggested modulation scheme and frequency plan. The invention has many possible uses and benefits, and performs the desired functions with a minimum of circuit components.

The above description and accompanying drawings provide various preferred embodiments of the present invention. It will be understood by one of ordinary skill in the art that specific references to components herein are by way of example only, the specific devices and device values being dictated by the particular requirements and engineering tradeoffs involved in a particular implementation. As one example, it will be appreciated that the various filters and demodulators can be implemented with a digital signal processing device instead of using analog components. It will be apparent that many modifications and variations of the present invention are possible in light of the above teachings. It is, therefore, to be understood that within the scope of the appended claims the invention may be practiced otherwise than as specifically described.

We claim:

1. A method for transmitting video information over a single pair of unshielded twisted pair (UTP) wires, comprising the steps of:

(1) frequency modulating a first carrier signal in accordance with a first composite video signal having a luminance component and a color subcarrier and producing thereby a first FM signal comprising a first upper sideband and a first lower sideband each including said color subcarrier of said first composite video signal;

(2) filtering said first FM signal with a first band pass filter to suppress said first upper sideband and to pass said first lower sideband, and producing thereby a first filtered signal having a frequency bandwidth of approximately 6 MHz; and (3) from a first physical location, injecting said first filtered signal into said single pair of UTP wires.

2. The method of claim 1, further comprising the steps of:

(4) from a second physical location, receiving said injected first filtered signal from said single pair of UTP wires;

(5) filtering said received first filtered signal to isolate said received first filtered signal from other signals on said single pair of UTP wires; and (6) frequency demodulating said isolated signal obtained at said step (5) and outputting said frequency demodulated signal to a first display device.

3. The method of claim 2, further comprising the steps of:

(7) at said second physical location, frequency modulating a second carrier signal in accordance with a second composite video signal having a luminance component and a color subcarrier and producing thereby a second FM signal comprising a second upper sideband and a second lower sideband each including said color subcarrier of said second composite video signal;

(8) filtering said second FM signal with a second band pass filter to suppress said second upper sideband and to pass said second lower sideband, and producing thereby a second filtered signal having a frequency bandwidth of approximately 6 MHz; and (9) injecting said second filtered signal into said single pair of UTP wires.

4. The method of claim 3, further comprising the steps of:

(10) from said first physical location, receiving said injected second filtered signal from said single pair of UTP wires;

(11) filtering said received second filtered signal to isolate said received second filtered signal from other signals on said single pair of UTP wires; and

(12) frequency demodulating said isolated signal obtained at said step (11) and outputting said frequency demodulated signal to a second display device.

5. The method of claim 1, wherein said step (1) comprises the step of using an NTSC video signal to frequency modulate said first carrier signal and producing said first FM signal with said color subcarrier located approximately 3.58 MHz above a center frequency of said first carrier signal.

6. The method of claim 1, wherein said step (1) comprises the step of using a PAL format video signal to frequency modulate said first carrier signal.

7. The method of claim 1, wherein said step (1) comprises the step of using a SECAM format video signal to frequency modulate said first carrier signal.

8. The method of claim 5, further comprising the step of convening an RGB computer screen display signal into said NTSC video signal.

9. The method of claim 5, wherein said step (1) comprises the step of frequency modulating a carrier signal having a center frequency of approximately 9 MHz.

10. The method of claim 5, wherein said step (1) comprises the step of frequency modulating a carrier signal having a center frequency of approximately 17 MHz.

11. The method of claim 1, further comprising the step of injecting a modulated data signal into said single pair of UTP wires concurrently with and separated in frequency spectrum from said first filtered signal.

12. The method of claim 11, wherein said step of injecting said modulated data signal comprises the step of injecting a digitally modulated data signal into said single pair of UTP wires.

13. The method of claim 11, wherein said step of injecting said modulated data signal comprises the step of injecting a separate FM-modulated audio signal into said single pair of UTP wires.

14. The method of claim 1, wherein said step (1) is conducted without performing any pre-emphasis of said first composite video signal.

15. The method of claim 1, wherein said step (3) comprises the step of using a pair of UTP wires having a length of between approximately 20 and 2,000 feet and which are incorporated into an office building, said pair of UTP wires being used primarily for telephone communications.

16. The method of claim 2, wherein said step (6) is performed without using any deemphasis.

17. The method of claim 3, wherein said step (7) comprises the step of using a carrier signal which has a center frequency at least 6 MHz higher than that of said first carrier signal, the method further comprising the step of amplifying said second filtered signal relative to said first filtered signal to accommodate signal attenuation at higher frequencies on said single pair of UTP wires.

18. The method of claim 17, wherein said step (1) comprises the step of using a carrier signal having a center frequency of approximately 9 MHz, and wherein step (7) comprises the step of using a carrier signal having a center frequency of approximately 17 MHz.

19. The method of claim 17, further comprising the step of injecting a modulated data signal into said single pair of UTP wires concurrently with and separated in frequency spectrum from said first filtered signal and said second filtered signal.

20. The method of claim 2, further comprising the step of injecting a telephone voice signal into said single pair of UTP wires.

21. Apparatus for transmitting video information over a single pair of unshielded twisted pair (UTP) wires, comprising:

first frequency modulation means for frequency modulating a first carrier signal in accordance with a first composite video signal having a luminance component and a color subcarrier and for producing thereby a first FM signal comprising a first upper sideband and a first lower sideband each including said color subcarrier of said first composite video signal;

first filtering means, coupled to said first frequency modulation means, for filtering said first FM signal to suppress said first upper sideband and to pass said first lower sideband, and for producing thereby a first filtered signal having a frequency bandwidth of approximately 6 MHz; and first injecting means, coupled to said first filtering means, for injecting said first filtered signal into said single pair of UTP wires at a first physical location.

22. The apparatus of claim 21, further comprising:

first receiving means for receiving, at a second physical location, said injected first filtered signal from said single pair of UTP wires;

second filtering means, coupled to said first receiving means, for filtering said received first filtered signal to isolate said received first filtered signal from other signals on said single pair of UTP wires; and first demodulating means, coupled to said second filtering means, for frequency demodulating said isolated first signal and outputting said frequency demodulated first signal to a first display device.

23. The apparatus of claim 22, further comprising:

second frequency modulation means for frequency modulating a second carrier signal in accordance with a second composite video signal having a luminance component and a color subcarrier and for producing thereby a second FM signal comprising a second upper sideband and a second lower sideband each including said color subcarrier of said second composite video signal;

third filtering means, coupled to said second frequency modulation means, for filtering said second FM signal to suppress said second upper sideband and to pass said second lower sideband, and for producing thereby a second filtered signal having a frequency bandwidth of approximately 6 MHz; and second injecting means, coupled to said third filtering means, for injecting said second filtered signal into said single pair of UTP wires at said second physical location.

24. The apparatus of claim 23, further comprising:

second receiving means for receiving, at said first physical location, said injected second filtered signal from said single pair of UTP wires;

fourth filtering means for filtering said received second filtered signal to isolate said received second filtered signal from other signals on said single pair of UTP wires; and second frequency demodulating means for demodulating said isolated second signal and outputting said demodulated second signal to a second display device.

25. The apparatus of claim 21, wherein said first composite video signal comprises an NTSC video signal, and wherein said first frequency modulation means produces said first FM signal with said color subcarrier located approximately 3.58 MHz above a center frequency of said first carrier signal.

26. The apparatus of claim 21, wherein said first composite video signal comprises a PAL format video signal.

27. The apparatus of claim 21, wherein said first composite video signal comprises a SECAM format video signal.

28. The apparatus of claim 25, further comprising a scan converter, coupled to said first frequency modulation means, for converting an RGB computer screen display signal into said first composite video signal.

29. The apparatus of claim 25, wherein said first carrier signal has a center frequency of approximately 9 MHz.

30. The apparatus of claim 25, wherein said first carrier signal has a center frequency of approximately 17 MHz.

31. The apparatus of claim 21, further comprising means for injecting a modulated data signal into said single pair of UTP wires concurrently with and separated in frequency spectrum from said first filtered signal.

32. The apparatus of claim 31, further comprising a digital modulator for digitally modulating a data signal and producing said modulated data signal.

33. The apparatus of claim 31, further comprising an FM modulator for frequency modulating an audio signal and producing said modulated data signal.

34. The apparatus of claim 21, wherein no pre-emphasis is performed on said first composite video signal.

35. The apparatus of claim 21, wherein said single pair of UTP wires has a length of between approximately 20 and 2,000 feet and which are incorporated into an office building, said single pair of UTP wires being used primarily for telephone communications.

36. The apparatus of claim 22, wherein no de-emphasis is performed on said frequency demodulated first signal before outputting to said first display device.

37. The apparatus of claim 23, wherein a center frequency of said second carrier signal is at least 6 MHz higher than that of said first carrier signal, the apparatus further comprising amplifying means for amplifying said second filtered signal relative to said first filtered signal to accommodate signal attenuation at higher frequencies on said single pair of UTP wires.

38. The apparatus of claim 37, wherein said first carrier signal has a center frequency of approximately 9 MHz, and wherein said second carrier signal has a center frequency of approximately 17 MHz.

39. The apparatus of claim 37, further comprising means for injecting a modulated data signal into said single pair of UTP wires concurrently with and separated in frequency spectrum from said first filtered signal and said second filtered signal.

40. The apparatus of claim 21, further comprising means for coupling and transmitting a telephone voice signal on said single pair of UTP wires concurrently with said first filtered signal.

41. A video device comprising:

an input terminal for accepting a first composite video signal having a first luminance component and a first color subcarrier;

a telephone terminal connectable to an unshielded twisted pair telephone line;

an FM modulator, coupled to said input terminal, for modulating said first composite video signal onto a carrier signal and producing thereby a first FM signal comprising a first upper sideband and a first lower sideband each including said first color subcarrier;

a bandpass filter coupled to said FM modulator and having a passband of approximately 6 MHz which suppresses said first upper sideband and passes said first lower sideband, producing therefrom a first filtered FM signal; and a transformer coupled between said bandpass filter and said telephone terminal for driving said telephone terminal in accordance with said first filtered FM signal.

42. The video device of claim 41, further comprising:

an output terminal for producing a second composite video signal having a second luminance component and a second color subcarrier;

a receive filter, coupled to said transformer, for isolating signals received from said telephone terminal in a different frequency band from said first filtered FM signal; and an FM demodulator, coupled between said receive filter and said output terminal, for demodulating signals from said receive filter and outputting to said output terminal.

43. The video device of claim 42, wherein no de-emphasis is performed between said FM demodulator and said output terminal.

44. The video device of claim 42, wherein said isolated signals are in a frequency band spaced approximately 2 MHz from said first filtered FM signal.

45. The video device of claim 42, wherein said first and second composite signals comprise NTSC standard video signals each having separate color subcarriers.

46. The video device of claim 42, wherein said carrier signal has a center frequency of approximately 9 MHz.

47. The video device of claim 42, wherein said carrier signal has a center frequency of approximately 17 MHz.

48. The video device of claim 42, further comprising means for amplifying said first FM signal relative to a second signal transmitted on said unshielded twisted pair telephone line when a center frequency of said carrier signal is higher than that of said second signal.

49. The video device of claim 42, further comprising means coupled to said telephone terminal for injecting a modulated data signal onto said unshielded twisted pair telephone line.

50. The video device of claim 49, further comprising a digital modulator for digitally modulating audio information to generate said modulated data signal.

51. The video device of claim 49, further comprising an FM modulator for frequency modulating audio information to generate said modulated data signal.

52. The video device of claim 42, further comprising a diplex filter for coupling a telephone voice signal to said telephone terminal.

53. Apparatus for transmitting video information over a single pair of unshielded twisted pair (UTP) wires, comprising:

first frequency modulation means for frequency modulating a first carrier signal in accordance with a first composite video signal having a luminance component and a color subcarrier and for producing thereby a first FM signal comprising a first upper sideband and a first lower sideband each including said color subcarrier of said first composite video signal;

first filtering means, coupled to said first frequency modulation means, for filtering said first FM signal to suppress said first lower sideband and to pass said first upper sideband, and for producing thereby a first filtered signal having a frequency bandwidth of approximately 6 MHz; and first injecting means, coupled to said first filtering means, for injecting said first filtered signal into said single pair of UTP wires at a first physical location.

54. The apparatus of claim 53, further comprising:

first receiving means, coupled to said single pair of UTP wires, for receiving a second FM signal transmitted from a different physical location;

second filtering means, coupled to said first receiving means, for filtering said received second FM signal to isolate said received second FM signal from other signals on said single pair of UTP wires; and first demodulating means, coupled to said second filtering means, for frequency demodulating said isolated received second FM signal and outputting to a first display device.

55. A method for transmitting video information over a single pair of unshielded twisted pair (UTP) wires, comprising the steps of:

(1) using a frequency modulation modulator to frequency modulate a carrier signal using a composite NTSC-compatible video signal comprising a luminance component and a chrominance component as a modulating signal, and producing thereby a frequency modulated carrier signal comprising an upper sideband and a lower sideband each comprising modulated portions of the composite video signal;

(2) filtering the frequency modulated carrier signal to suppress the upper sideband and producing thereby a filtered signal having a frequency bandwidth of approximately 6 MHz; and (3) injecting the filtered signal into the single pair of UTP wires.

* * * * *